(12) United States Patent
Webster

(10) Patent No.: US 8,584,442 B2
(45) Date of Patent: Nov. 19, 2013

(54) GAS TURBINE ENGINE VARIABLE AREA EXHAUST NOZZLE

(75) Inventor: John Richard Webster, Derby (GB)

(73) Assignee: Rolls-Royce PLC (GB)

( * ) Notice: Subject to any disclaimer, the term of this patent is extended or adjusted under 35 U.S.C. 154(b) by 1306 days.

(21) Appl. No.: 12/571,933

(22) Filed: Oct. 1, 2009

(65) Prior Publication Data

US 2010/0146932 A1 Jun. 17, 2010

(30) Foreign Application Priority Data

Nov. 5, 2008 (GB) .................................. 0820175.8

(51) Int. Cl.
*B63H 11/00* (2006.01)

(52) U.S. Cl.
USPC ............................................. 60/204; 60/771

(58) Field of Classification Search
USPC ......................... 60/226.1, 262, 770, 771, 204; 239/265.19, 265.39, 265.43
See application file for complete search history.

(56) References Cited

U.S. PATENT DOCUMENTS

| 6,718,752 | B2 * | 4/2004 | Nesbitt et al. .................. 60/204 |
| 2005/0229585 | A1 * | 10/2005 | Webster ....................... 60/226.1 |
| 2008/0256957 | A1 * | 10/2008 | Webster .......................... 60/770 |
| 2008/0272228 | A1 | 11/2008 | Mengle et al. |
| 2009/0133406 | A1 * | 5/2009 | Dijoud et al. .................... 60/771 |
| 2010/0058769 | A1 * | 3/2010 | Baran ............................. 60/771 |

FOREIGN PATENT DOCUMENTS

| EP | 0984152 A3 | 3/2001 |
| GB | 766985 A | 1/1957 |
| GB | 849502 A | 9/1960 |

* cited by examiner

*Primary Examiner* — Phutthiwat Wongwian

(74) *Attorney, Agent, or Firm* — McCormick, Paulding & Huber LLP

(57) ABSTRACT

A gas turbine engine variable area exhaust nozzle has a plurality of first and second movable members arranged circumferentially around a fan casing extending in downstream. The first and second movable members alternate around the variable area nozzle. During cruise conditions the first and second movable members are in un-actuated positions. At take off conditions the first movable members are in an actuated position and the second movable members are in the un-actuated position. At top of climb conditions the first movable members are in the un-actuated position and the second movable members are in an actuated position. The first movable members move radially outwardly from the un-actuated position to the actuated position and the second movable members move radially inwardly from the un-actuated position to the actuated position.

19 Claims, 7 Drawing Sheets

GAS TURBINE ENGINE VARIABLE AREA EXHAUST NOZZLE

CROSS REFERENCE TO RELATED APPLICATION

This application is entitled to the benefit of British Patent Application No. GB 0820175.8, filed on Nov. 5, 2008.

FIELD OF THE INVENTION

The present invention relates to a gas turbine engine variable area exhaust nozzle and in particular to a variable area exhaust nozzle for an aircraft turbofan gas turbine engine.

BACKGROUND OF THE INVENTION

It is known from our published UK patent application No. GB2374121A to provide a plurality of circumferentially arranged movable tabs at the downstream end of a turbofan gas turbine engine exhaust nozzle. The tabs are moved between a non-deployed and a deployed position to reduce exhaust noise while in the deployed position.

It is also known from GB2374121A to provide a plurality of circumferentially arranged fixed tabs and a plurality of circumferentially arranged movable tabs at the downstream end of the turbofan gas turbine engine exhaust nozzle. The fixed tabs and movable tabs are arranged circumferentially alternately. The movable tabs are moved between a non-deployed and a deployed position. The movable tabs reduce exhaust noise while in the deployed position. The movable tabs are circumferentially aligned with the fixed tabs in the non-deployed position to reduce aerodynamic drag.

It is also known from GB2374121A to provide a plurality of circumferentially arranged fixed tabs and a plurality of circumferentially arranged movable tabs at the downstream end of the turbofan gas turbine engine exhaust nozzle. The fixed tabs and movable tabs are arranged circumferentially alternately. The movable tabs are moved between a non-deployed and a deployed position. The fixed tabs reduce exhaust noise when the movable tabs are in the deployed position and the movable tabs increase the area of the nozzle to compensate for the reduction in the area due to the fixed tabs. The movable tabs are circumferentially aligned with the fixed tabs in the non-deployed position to reduce aerodynamic drag.

SUMMARY OF THE INVENTION

Accordingly, the present invention seeks to provide a novel gas turbine engine variable area nozzle.

Accordingly, the present invention provides a gas turbine engine having a casing defining a flow passage through the gas turbine engine, a variable area nozzle being arranged at the downstream end of the casing, the variable area nozzle having a plurality of first movable members arranged circumferentially around and extending in a downstream direction from the downstream end of the annular casing and a plurality of second movable members arranged around and extending in a downstream direction from the downstream end of the casing, in a first mode of operation the first movable members are in an un-actuated position and the second movable members are in an un-actuated position, in a second mode of operation the first movable members are in an actuated position and the second movable members are in the un-actuated position and in a third mode of operation the first movable members are in the un-actuated position and the second movable members are in an actuated position, wherein the first movable members are movable outwardly from the un-actuated position to the actuated position and the second movable members are movable inwardly from the un-actuated position to the actuated position.

Preferably first actuation means to move the first movable members from the un-actuated position to the actuated position and second actuation means to move the second movable members from the un-actuated position to the actuated position.

Preferably in the un-actuated position the first and second movable members are aligned.

Preferably the first movable members being movable generally outwardly in the second mode of operation to increase the area of the variable area nozzle and the second movable members being movable generally inwardly in the third mode of operation to reduce the area of the variable area nozzle.

Preferably the first and second movable members are arranged alternately around the variable area exhaust nozzle.

The variable area exhaust nozzle may comprise a plurality of third fixed members arranged around the annular casing and extending in a downstream direction from the downstream end of the casing.

Preferably each third member is positioned between one of the first movable members and one of the second movable members.

The first movable members and third fixed members have cooperating means to locate the first movable members in the un-actuated position and prevent the first movable members moving inwardly.

The second movable members and third fixed members have cooperating means to locate the second movable members in the un-actuated position and prevent the second movable members moving outwardly.

The first and second movable members may be arranged to define a wavy downstream end for the variable area nozzle, the wavy downstream end having peaks remotest from the downstream end of the casing and troughs nearest to the downstream end of the casing.

Each first movable member having a shaped downstream end to define one of the troughs at the downstream end of the variable area nozzle and each second movable member having a shaped downstream end to define one of the peaks at the downstream end of the variable area nozzle.

Preferably the variable area nozzle is a variable area fan exhaust nozzle and the casing is a fan casing.

Preferably a core engine casing is positioned coaxially within the fan casing.

Preferably the core engine casing having a region of increased diameter and a region of decreasing diameter downstream of the region of increased diameter.

Preferably the region of increased diameter of the core engine casing is axially upstream of the peaks at the downstream end of the variable area nozzle and upstream of the downstream ends of the second members.

Preferably the region of increased diameter of the core engine casing is axially aligned with the troughs at the downstream end of the variable area nozzle and aligned with the downstream ends of the first members.

Preferably at least a portion of each first movable member comprises shape memory material, more preferably the at least a portion of each first movable member comprises shape memory alloy.

Preferably at least a portion of each second movable member comprises shape memory material, more preferably the at least a portion of each second movable member comprises shape memory alloy.

The first actuation means comprises heating means to heat the shape memory material portion of each first movable member.

The second actuation means comprises heating means to heat the shape memory material portion of each second movable member.

The first actuation means may move the first movable members to positions between the un-actuated and actuated position.

The second actuation means may move the second movable members to positions between the un-actuated and actuated position.

In the first mode of operation the variable area nozzle has an intermediate cross-sectional area, in the second mode of operation the variable area nozzle has a maximum cross-sectional area and in the third mode of operation the variable area nozzle has a minimum cross-sectional area.

The first movable member may comprise a composite article having a composite member, a flexible member and at least one shape memory material member, the at least one shape memory material member extending substantially parallel to the composite member and the flexible member being positioned between the composite member and the at least one shape memory material member to bond the at least one shape memory material member to the composite member and to maintain a separation between the composite member and the at least one shape memory material member.

The second movable member may comprise a composite article having a composite member, a flexible member and at least one shape memory material member, the at least one shape memory material member extending substantially parallel to the composite member and the flexible member being positioned between the composite member and the at least one shape memory material member to bond the at least one shape memory material member to the composite member and to maintain a separation between the composite member and the at least one shape memory material member.

Preferably the casing is annular, the first movable members are arranged circumferentially around the annular casing, the second movable members are arranged circumferentially around the annular casing, the first movable members are movable radially outwardly from the un-actuated position and the second movable members are movable radially inwardly from the un-actuated position to the actuated position.

The present invention also provides a method of operating a gas turbine engine having a casing defining a flow passage through the gas turbine engine, a variable area nozzle being arranged at the downstream end of the casing, the variable area nozzle having a plurality of first movable members arranged around and extending in a downstream direction from the downstream end of the casing and a plurality of second movable members arranged around and extending in a downstream direction from the downstream end of the casing, in a first mode of operation maintaining the first movable members in an un-actuated position and maintaining the second movable members in an un-actuated position, in a second mode of operation moving the first movable members to an actuated position and maintaining the second movable members in the un-actuated position and in a third mode of operation moving the first movable members to an un-actuated position and maintaining the second movable members in an actuated position, moving the first movable members outwardly from the un-actuated position to the actuated position to increase the area of the variable area nozzle and moving the second movable members inwardly from the un-actuated position to the actuated position to decrease the area of the variable area nozzle.

DETAILED DESCRIPTION OF THE PREFERRED EMBODIMENTS

Figure 1:
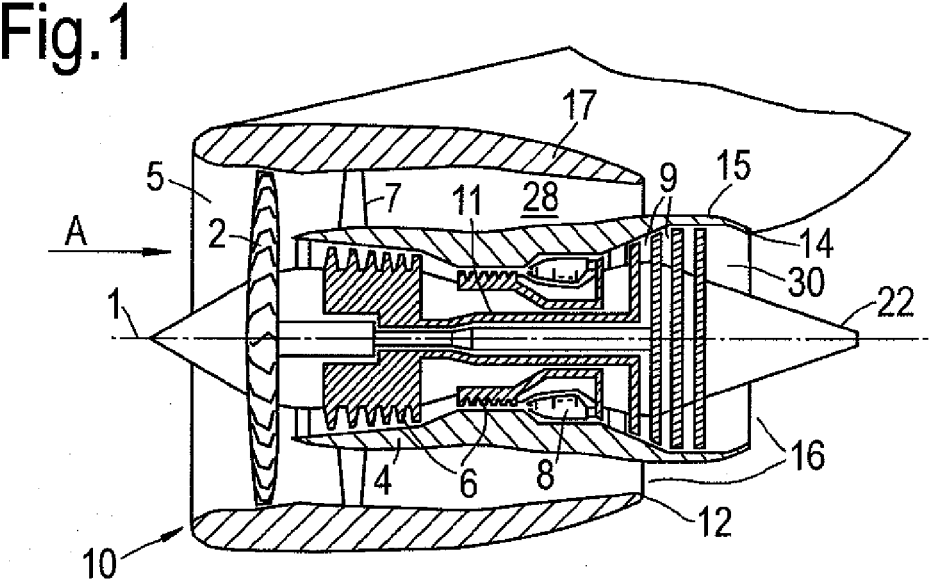
FIG. 1 shows a turbofan gas turbine engine having a variable area nozzle according to the present invention.

A turbofan gas turbine engine 10, as shown in FIG. 1, comprises in axial flow series an air intake 5, a propulsive fan 2, a core engine 4 and an exhaust nozzle assembly 16 all disposed coaxially about an engine axis 1. The core engine 4 comprises in axial flow series a series of compressors 6, a combustor 8 and a series of turbines 9. The direction of airflow through the turbofan gas turbine engine 10 in operation is indicated by arrow A and the terms upstream and downstream are used with reference to this general flow direction. Air is drawn through the air intake 5 and is compressed by the fan 2. The airflow from the fan 2 is split between a flow through the core engine 4 and a bypass flow. The flow through the core engine 4 flows through the compressors 6 where it is further compressed and into the combustor 8 where it is mixed with fuel and the fuel is burnt in the air in the combustor 8. The combustion of the fuel in the compressed air in the combustor 8 produces hot gases, which exit the combustor 8 and flow downstream through and drive the turbines 9. The turbines 9 drive the compressors 6 and fan 2 via shafts 11 which drivingly connect the turbines 9 with the compressors 6 and the fan 2.

The exhaust gases leaving the turbine 9 flow through the exhaust nozzle assembly 16 to provide propulsive thrust. The remainder of the air from the fan 2, the bypass flow, flows within a bypass duct 7 around the core engine 4. The bypass flow, which has been accelerated by the fan 2 also flows to the exhaust nozzle assembly 16 where it is exhausted, as a bypass exhaust stream to provide further, the majority of the, propulsive thrust.

The velocity of the bypass exhaust stream is significantly lower than the velocity of the core engine exhaust stream. Turbulent mixing of the bypass exhaust stream and the core engine exhaust stream occurs in the region of, and downstream of, the exhaust nozzle assembly 16. These two exhaust streams also mix with the ambient air surrounding and downstream of the exhaust nozzle assembly 16. This mixing of the two exhaust streams and the ambient air produces noise.

The exhaust nozzle assembly 16 comprises two concentric exhaust nozzles, a radially outer bypass, or fan, exhaust nozzle 12 and a radially inner core exhaust nozzle 14. The core exhaust nozzle 14 is defined at its radially outer extent by a generally frusto-conical core nozzle wall 15 and at its radially inner extent by a frusto-conical engine plug structure 22. The bypass, or fan, exhaust nozzle 12 is defined at its radially outer extent by a nacelle, or fan casing, 17 and at its radially inner extent by the core nozzle wall 15.

A first embodiment of the present invention, the bypass, or fan, exhaust nozzle 12 is shown more clearly in FIGS. 2 to 7 and the bypass, or fan, exhaust nozzle 12 is a variable area fan exhaust nozzle. The bypass duct 7 is also defined at its radially outer extent by the nacelle, or casing, 17 and the nacelle, fan casing, 17 is generally annular and arranged coaxial with the engine axis 1. Thus the nacelle, fan casing, 17 defines a flow passage through the turbofan gas turbine engine 10. The bypass, or fan, variable area exhaust nozzle 12 is arranged at the downstream end of the nacelle, fan casing, 17.

The variable area fan exhaust nozzle 12 comprises a plurality of first movable members 18 arranged circumferentially around the annular fan casing 17 and the first movable members 18 extend in a downstream direction from the downstream end of the annular fan casing 17. A plurality of second movable members 20 are also arranged circumferentially around the annular fan casing 17 and the second movable members 20 extend in a downstream direction from the downstream end of the annular fan casing 17. A plurality of third fixed members 22 are arranged circumferentially around the annular fan casing 17 and extend in a downstream direction from the downstream end of the annular fan casing 17. The first and second movable members 18 and 20 respectively are arranged alternately circumferentially around the variable area fan exhaust nozzle 12. Each third fixed member 22 is positioned between one of the first movable members 18 and one of the second movable members 20. Thus, in the variable area fan exhaust nozzle 12 the members 18, 20 and 22 are arranged circumferentially in the sequence a first movable member 18, a third fixed member 22, a second movable member 22 and a third fixed member 22. This sequence of the members 18, 20 and 22 is repeated a number of times circumferentially around the variable area fan exhaust nozzle 12.

Figure 2:
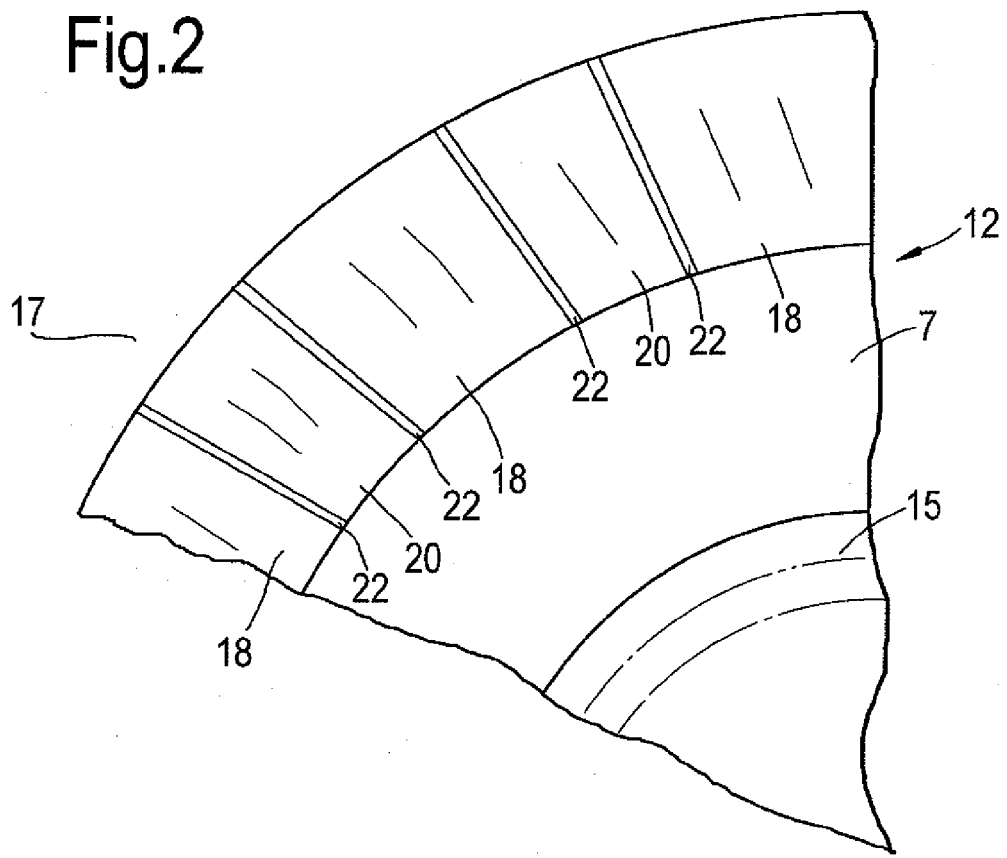
FIG. 2 is a perspective view of a portion of a first embodiment of a variable area nozzle according to the present invention in a first mode of operation.
Figure 3:
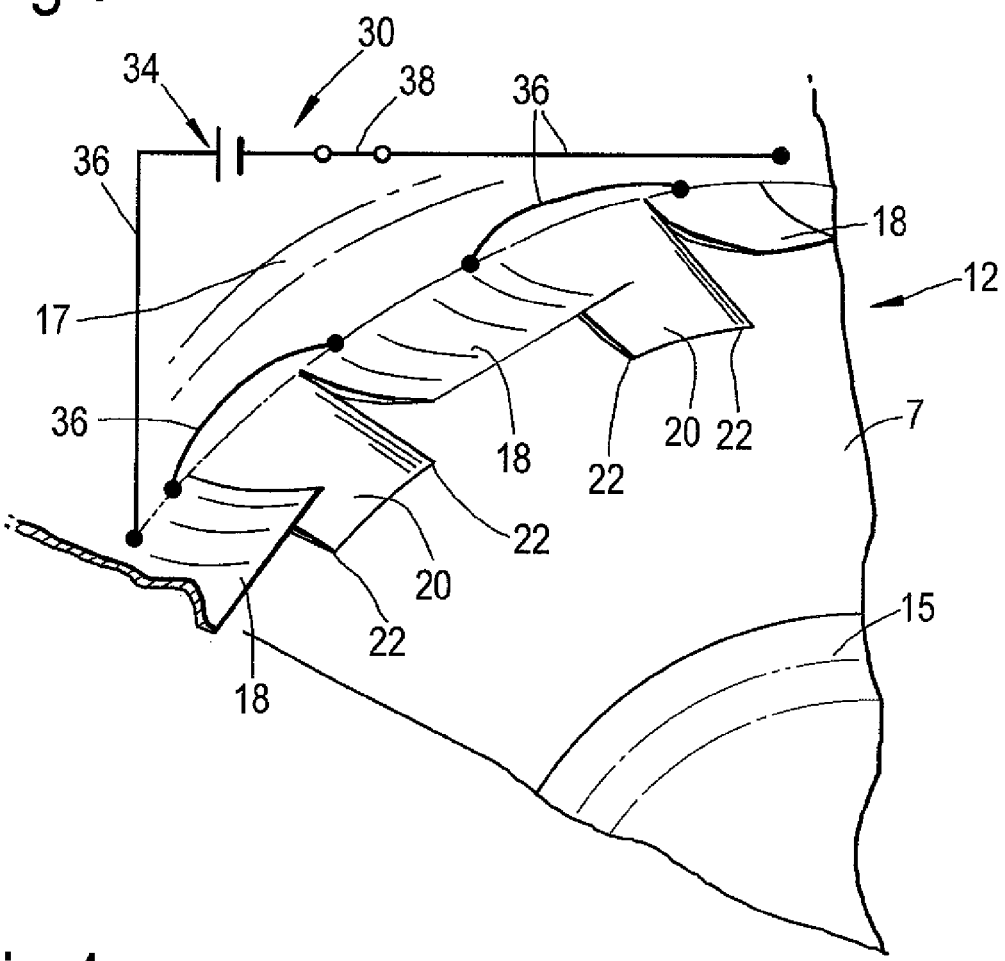
FIG. 3 is a perspective view of the portion of the first embodiment of the variable area nozzle shown in FIG. 2 in a second mode of operation.
Figure 4:
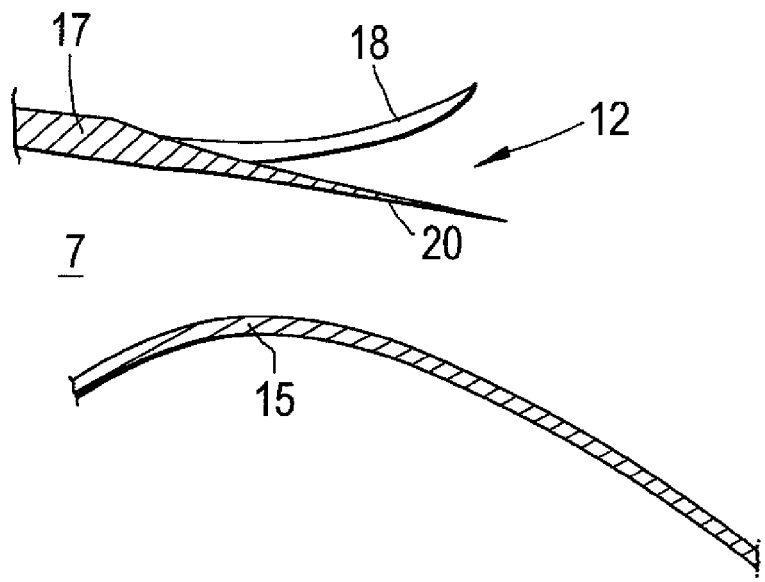
FIG. 4 is a cross-sectional view through the gas turbine engine and the portion of the first embodiment of the variable area nozzle shown in FIG. 2 in a plane containing the axis of the gas turbine engine in the second mode of operation.
Figure 5:
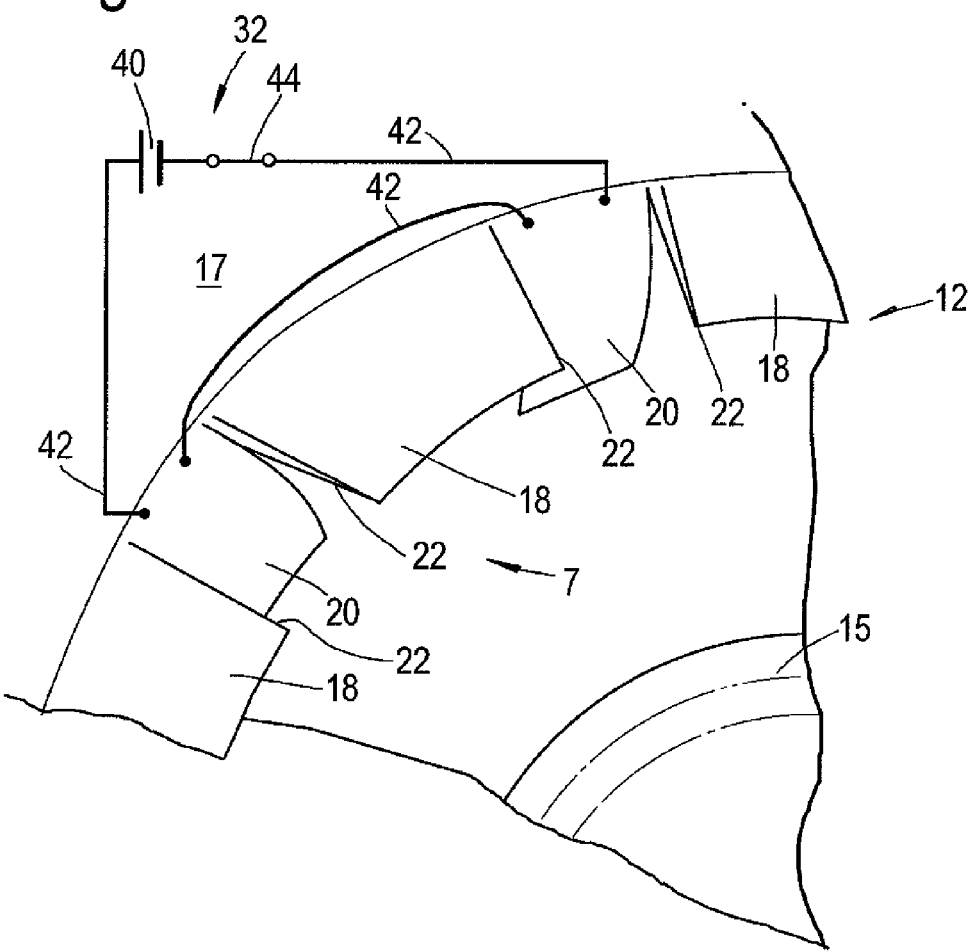
FIG. 5 is a perspective view of a portion of the first embodiment of the variable area nozzle shown in FIG. 2 in a third mode of operation.
Figure 6:
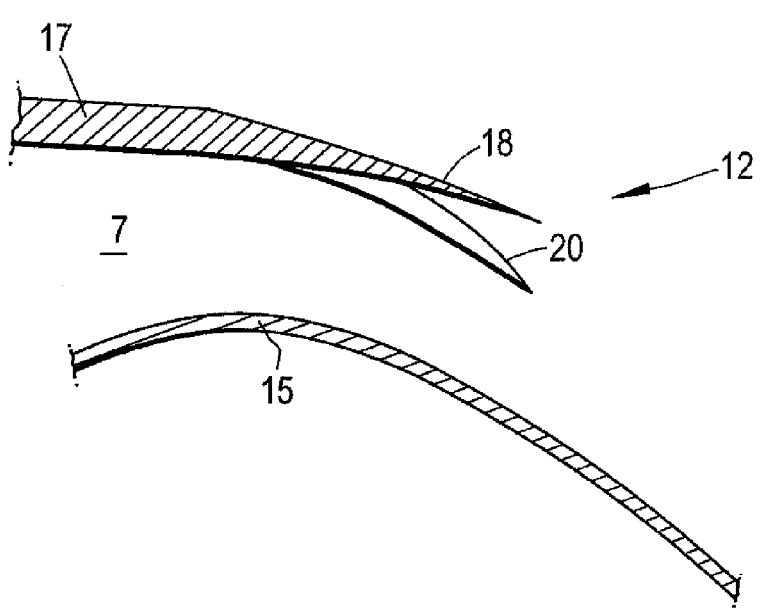
FIG. 6 is a cross-sectional view through the gas turbine engine and the portion of the first embodiment of the variable area nozzle shown in FIG. 2 in a plane containing the axis of the gas turbine engine in the third mode of operation.

In a first mode of operation the first movable members 18 are in an un-actuated position and the second movable members 20 are in an un-actuated position as shown in FIG. 2. In a second mode of operation the first movable members 18 are in an actuated position and the second movable members 20 are in the un-actuated position as shown in FIGS. 3 and 4 and in a third mode of operation the first movable members 18 are in the un-actuated position and the second movable members 20 are in an actuated position as shown in FIGS. 5 and 6. The first movable members 18 are moved generally radially outwardly from the un-actuated position to the actuated position in the second mode of operation to increase the area of the variable area fan exhaust nozzle 12. The second movable members 20 are moved generally radially inwardly from the un-actuated position to the actuated position in the third mode of operation to reduce the area of the variable area fan exhaust nozzle 12.

The first movable members 18 are moved generally radially outwardly from the un-actuated position to the actuated position in the second mode of operation and the second movable members 20 are moved radially inwardly from the un-actuated position to the actuated position in the third mode of operation.

In the un-actuated position the first movable members 18, the second movable members 20 and the third fixed members 22 are radially aligned, or at the same radial distance from the axis 1 of the gas turbine engine 10, and the inner surfaces of the first movable members 18, the second movable members 20 and the third fixed members 22 together form a cylindrical surface or a frusto-conical surface.

Figure 7:
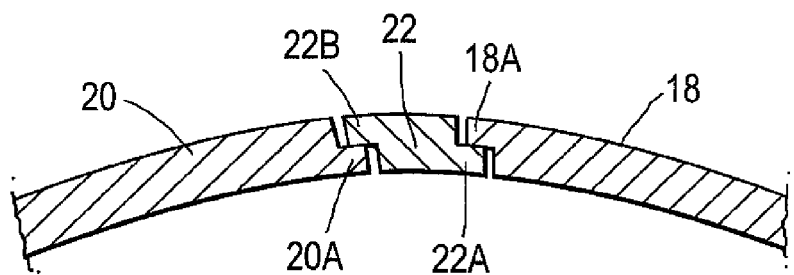
FIG. 7 is cross-sectional view through a portion of the variable area nozzle shown in FIG. 2 in a plane perpendicular to the axis of the gas turbine engine.
Figure 8:
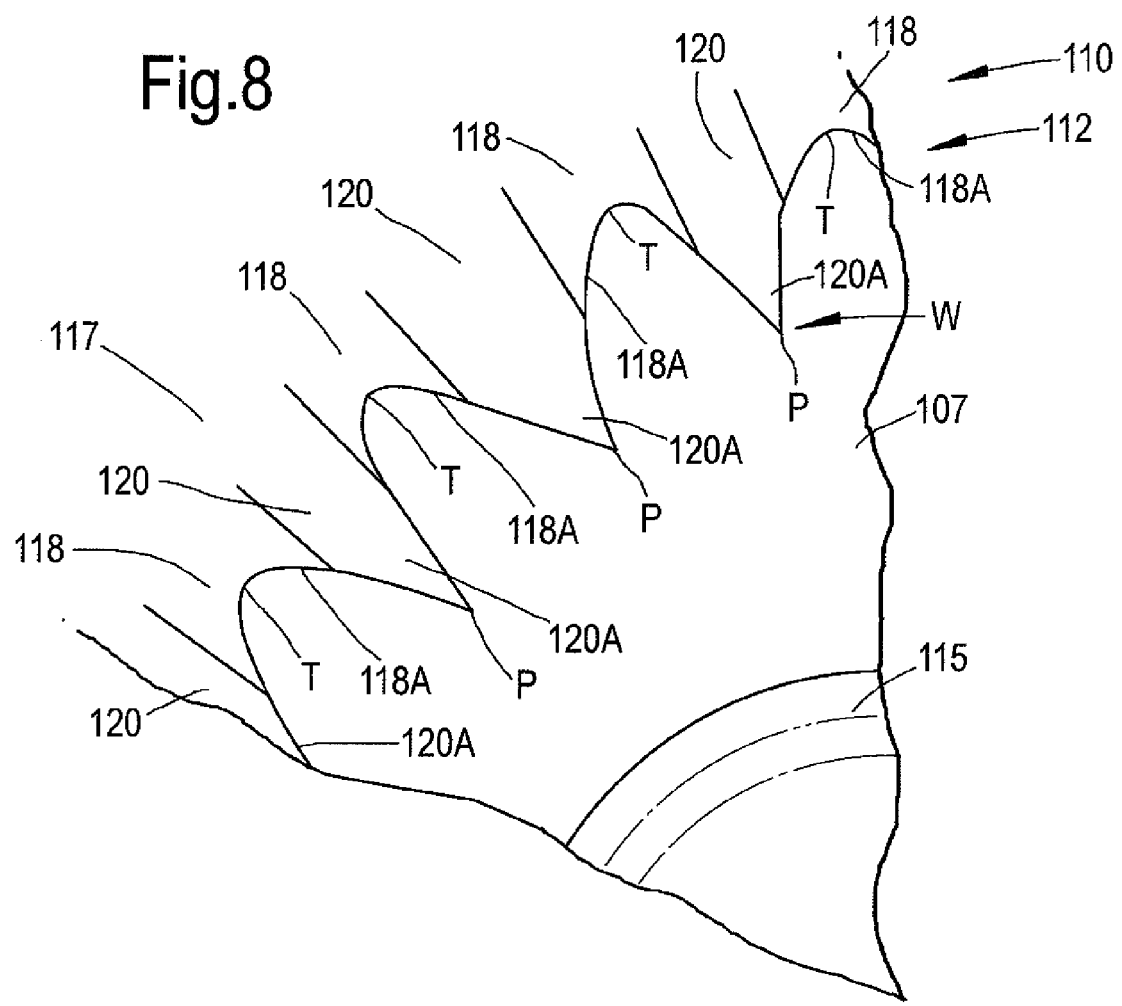
FIG. 8 is a perspective view of a portion of a second embodiment of a variable area nozzle according to the present invention in a first mode of operation.
Figure 9:
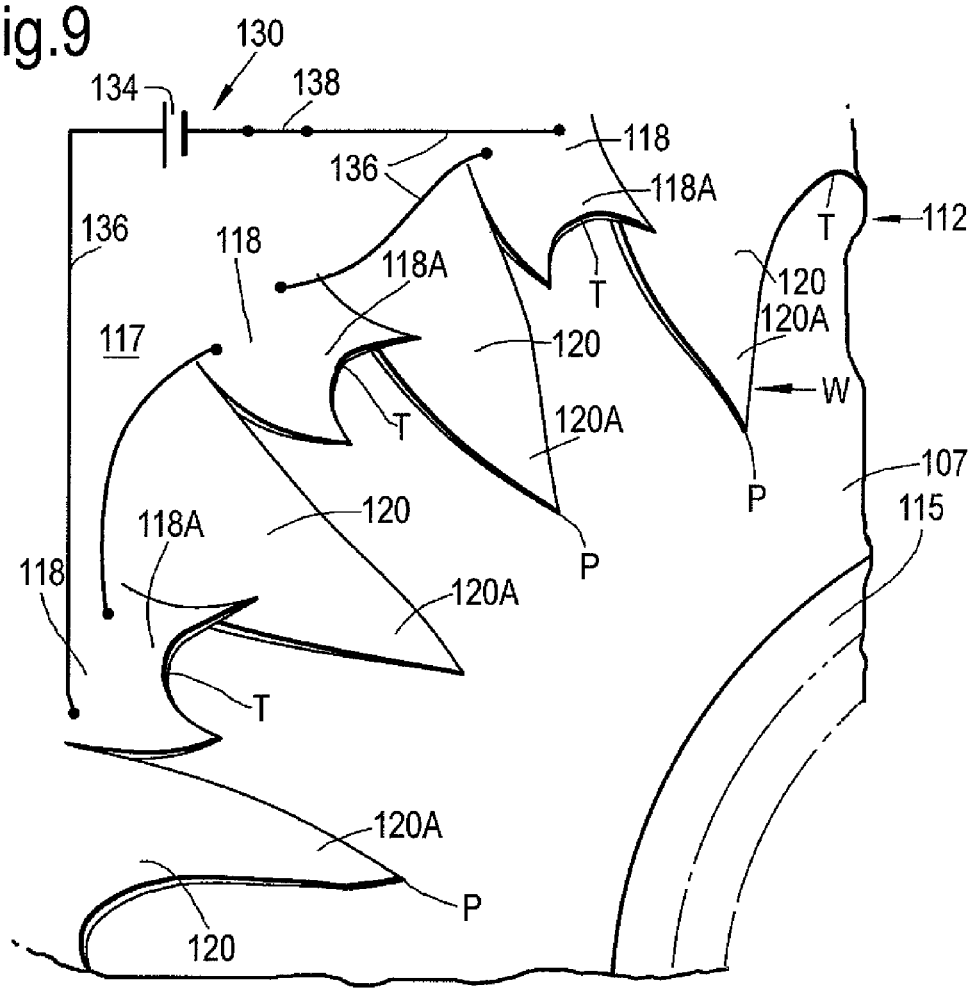
FIG. 9 is a perspective view of the portion of the second embodiment of the variable area nozzle shown in FIG. 8 in a second mode of operation.
Figure 10:
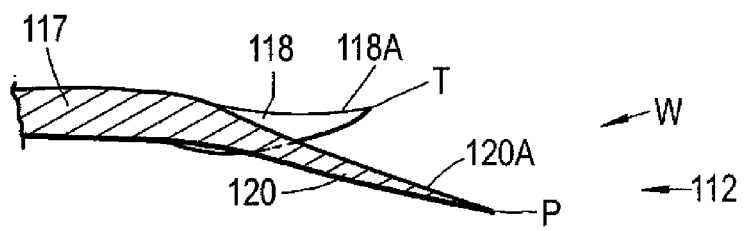
FIG. 10 is a cross-sectional view through the gas turbine engine and the portion of the second embodiment of the variable area nozzle shown in FIG. 8 in a plane containing the axis of the gas turbine engine in the second mode of operation.
Figure 10:
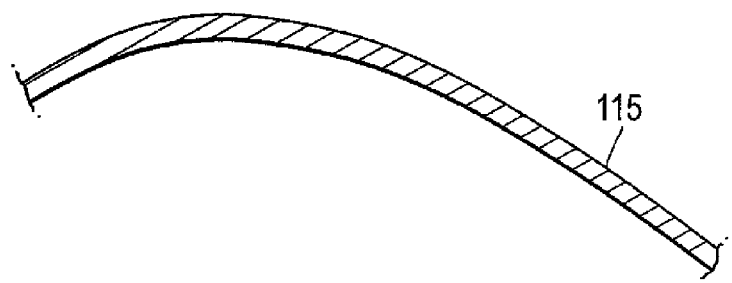
Figure 11:
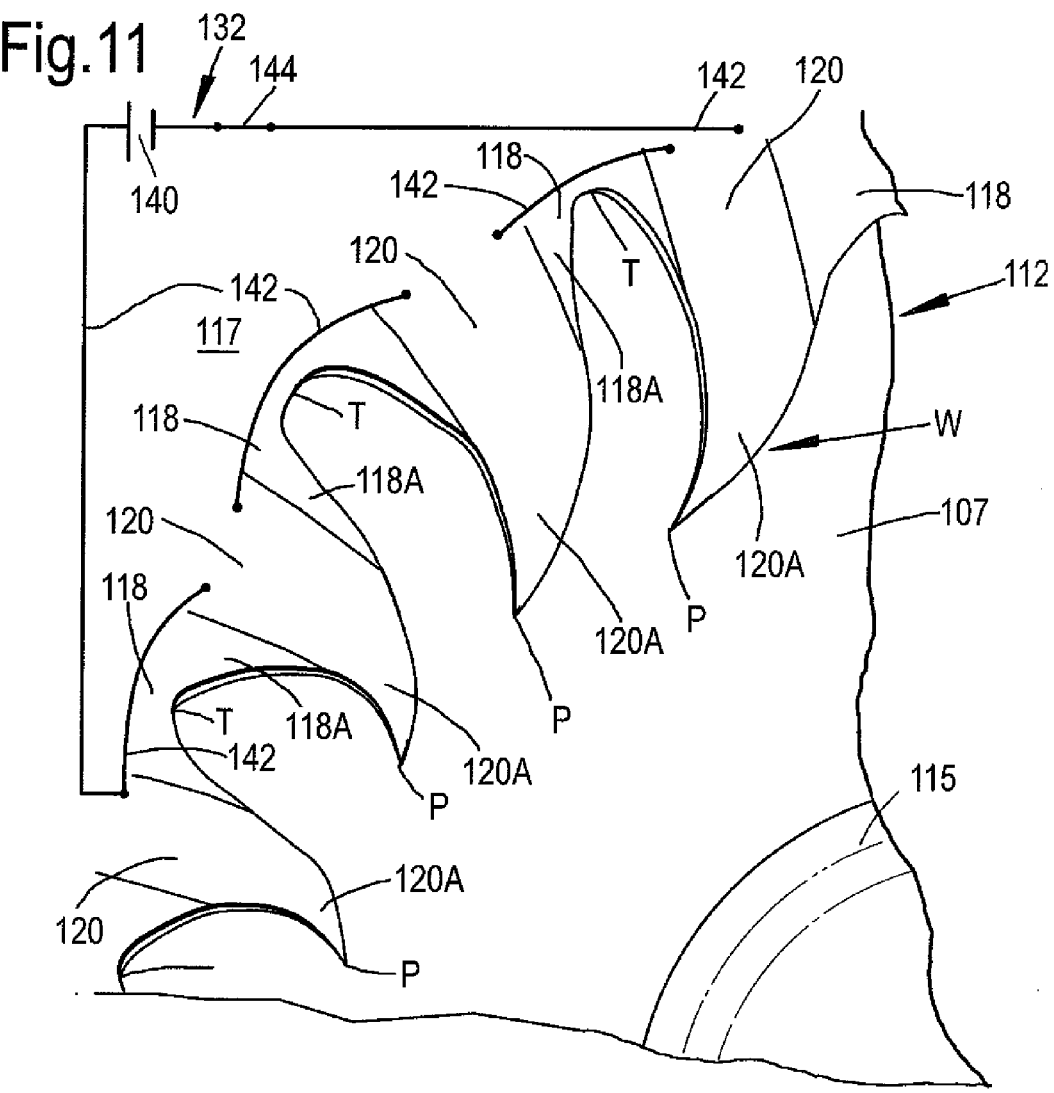
FIG. 11 is a perspective view of a portion of the second embodiment of the variable area nozzle shown in FIG. 8 in a third mode of operation.
Figure 12:
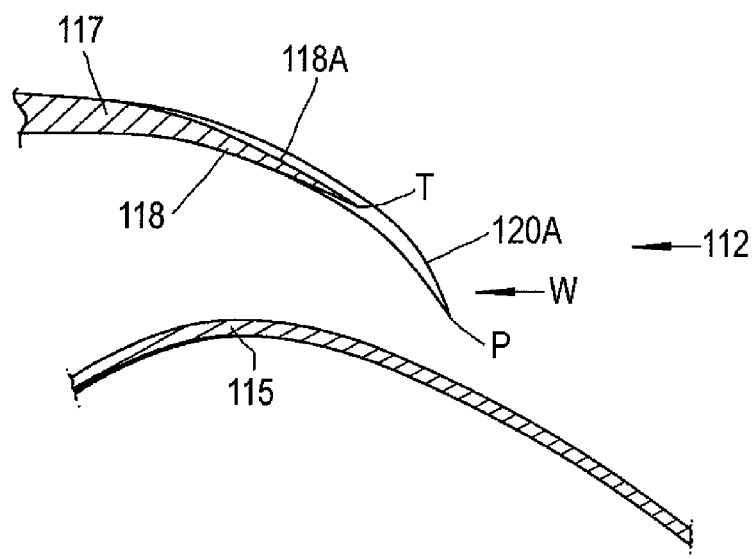
FIG. 12 is a cross-sectional view through the gas turbine engine and the portion of the second embodiment of the variable area nozzle shown in FIG. 8 in a plane containing the axis of the gas turbine engine in the third mode of operation.

The first movable members 18 and the third fixed members 22 have cooperating means, stop means, to locate the first movable members 18 in the un-actuated position and prevent the first movable members 18 moving radially inwardly. In particular the third fixed members 22 have projections 22A extending circumferentially from their radially inner ends which cooperate with projections 18A extending circumferentially from radially outer ends of the first movable members 18. The projections 18A and 22A extend axially along the edges of the first movable members 18 and the third fixed members 22 respectively. Similarly the second movable members 20 and third fixed members 22 have cooperating means to locate the second movable members 20 in the un-actuated position and prevent the second movable members 20 moving radially outwardly. In particular the third fixed members 22 have projections 22B extending circumferentially from their radially outer ends which cooperate with projections 20A extending circumferentially from the radially outer ends of the second movable members 20. The projections 20A and 22A extend axially along the edges of the second movable members 20 and the third fixed members 22 respectively, as shown in FIG. 7. In the un-actuated position the projections 18A of the first movable members 18 abut the projections 22A of the third fixed members 22 and the projections 20A of the second movable members 20 abut the projections 22B of the third fixed members 22.

There are first actuation means 30 to move the first movable members 18 from the un-actuated position to the actuated position and second actuation means 32 to move the second movable members 20 from the un-actuated position to the actuated position.

At least a portion of each first movable member 18 comprises shape memory material, for example the portion of each first movable member 18 comprise shape memory alloy. At least a portion of each second movable member 20 comprises shape memory material, for example the portion of each second movable member 20 comprises shape memory alloy. Alternatively the whole of each first movable member 18 and the whole of each second movable member 20 may comprise shape memory material, shape memory alloy.

The first actuation means 30 comprises heating means to heat the shape memory material of the first movable members 18 and the second actuation means 32 comprises heating means to heat the shape memory material of the second movable members 20. The first actuation means 30 comprises a first electrical power source 34, first electrical connectors 36 to connect the first electrical power source 34 to the first movable members 18 and a first switch 38. Similarly the second actuation means 32 comprises a second electrical power source 40, second electrical connectors 42 to connect the second electrical power source 40 to the second movable members 20 and a second switch 44. The first and second switches 38 and 44 are closed at the appropriate times to supply electrical power to the shape memory material portions of the first and second movable members 18 and 20 respectively to move the first and second movable members 18 and 20 respectively from their un-actuated positions to their actuated positions. The switches 38 and 44 are controlled by an engine control unit.

In particular the first movable members 18 and the second movable members 20 are arranged in their un-actuated positions when the turbofan gas turbine engine 10 is operating in the first mode of operation at cruise conditions. In the first mode of operation the variable area fan nozzle forms an aerodynamically smooth shape and minimises the fuel consumption and minimises the specific fuel consumption. The first movable members 18 are moved to their actuated positions when the turbofan gas turbine engine 10 is operating in the second mode of operation at take off conditions. In the second mode of operation the variable area fan nozzle is increased to its maximum area position to reduce fan flutter and noise. The second movable members 20 are moved to their actuated positions when the turbofan gas turbine engine 10 is operating at high power conditions, e.g. in the third mode of operation at top of climb conditions. In the third mode of operation the variable area fan nozzle is decreased to its minimum area position to reduce the rotational speed of the fan. By reducing the rotational speed of the fan at high power conditions, e.g. the top of climb conditions, it is possible to reduce the weight of the fan disc required to carry the fan blades and to reduce the weight of the fan containment required to contain a detached fan blade. In addition the weight of the turbine blades and turbine discs of the turbine driving the fan may be reduced and the turbine entry temperature may be reduced to increase the life of the turbine blades.

In another embodiment of the present invention, the variable area fan exhaust nozzle comprises only first movable members and second movable members. This operates in substantially the same way as that described with reference to FIGS. 2 to 6. The first and second movable members need not be arranged alternately circumferentially around the variable area exhaust nozzle.

A second embodiment of the present invention, the bypass, or fan, exhaust nozzle 112 is shown more clearly in FIGS. 8 to 12 and the bypass, or fan, exhaust nozzle 112 is a variable area fan exhaust nozzle. The bypass duct 107 is also defined at its radially outer extent by the nacelle, or casing, 117 and the nacelle, fan casing, 117 is generally annular and arranged coaxial with the engine axis 101. Thus the nacelle, fan casing, 117 defines a flow passage through the turbofan gas turbine engine 110. The variable area fan exhaust nozzle 112 is arranged at the downstream end of the nacelle, fan casing, 117.

The variable area fan exhaust nozzle 112 comprises a plurality of first movable members 118 arranged circumferentially around the annular fan casing 117 and the first movable members 118 extend in a downstream direction from the downstream end of the annular fan casing 117. A plurality of second movable members 120 are also arranged circumferentially around the annular fan casing 117 and the second movable members 120 extend in a downstream direction from the downstream end of the annular fan casing 117. The first and second movable members 118 and 120 respectively are arranged alternately circumferentially around the variable area fan exhaust nozzle 112.

The first and second members 118 and 120 are arranged to define a wavy downstream end W for the variable area fan exhaust nozzle 112, the wavy downstream end W has peaks P remote from the downstream end of the annular fan casing 117 and troughs T nearest to the downstream end of the annular fan casing 117.

Each first movable member 118 has a shaped downstream end 118A to define one of the troughs T at the downstream end of the variable area fan exhaust nozzle 112 and each second movable member 120 has a shaped downstream end 120A to define one of the peaks P at the downstream end of the variable area fan exhaust nozzle 112. The wavy downstream end W of the variable area fan exhaust nozzle 112 comprises a plurality of triangular tabs separated by correspondingly shaped triangular notches. Each triangular tab is partially defined by two of the first movable members 118 and partially defined by one of the second movable members 120 and the second movable member 120 is located circumferentially between the two first movable members 118. Each first movable member 118 actually defines end regions at circumferential ends of an upstream portion of two adjacent triangular tabs. Each second movable member 120 defines a middle region circumferentially between the end regions of the upstream portion of the triangular tab and each second movable member 120 defines a downstream portion of the respective triangular tab.

The core engine casing, the core nozzle wall 115 has a region 114 of increased diameter and a region 116 of decreasing diameter downstream of the region of increased diameter 114. The region 116 of the core nozzle wall 115 is generally frustoconical. The region 114 of increased diameter of the core engine casing, core nozzle wall, 115 is axially upstream of the peaks P at the downstream end of the variable area fan exhaust nozzle 112 and upstream of the downstream ends of the second members 120. The region 114 of increased diameter of the core engine casing, core nozzle wall, 115 is axially aligned with the troughs T at the downstream end of the variable area fan exhaust nozzle 112 and aligned with the downstream ends of the first members 118.

There are first actuation means 130 to move the first movable members 118 from the un-actuated position to the actuated position and second actuation means 132 to move the second movable members 120 from the un-actuated position to the actuated position.

At least a portion of each first movable member 118 comprises shape memory material, for example the portion of each first movable member 118 comprise shape memory alloy. At least a portion of each second movable member 120 comprises shape memory material, for example the portion of each second movable member 120 comprises shape memory alloy.

The first actuation means 130 comprises heating means to heat the shape memory material portions of the first movable members 118 and the second actuation means 132 comprises heating means to heat the shape memory material portions of the second movable members 120. The first actuation means 130 comprises a first electrical power source 134, first electrical connectors 136 to connect the first electrical power source 134 to the first movable members 18 and a first switch 138. Similarly the second actuation means 132 comprises a second electrical power source 140, second electrical connectors 142 to connect the second electrical power source 140 to the second movable members 120 and a second switch 144. The first and second switches 138 and 144 are closed at the appropriate times to supply electrical power to the first and second movable members 118 and 120 respectively to move the first and second movable members 118 and 120 respectively from their un-actuated positions to their actuated positions. The switches 138 and 144 are controlled by an engine control unit.

This embodiment operates in substantially the same way as that described with reference to FIGS. 2 to 6.

The advantage of the embodiment shown in FIGS. 8 to 12 is that the wavy downstream end of the variable area fan exhaust nozzle also reduces the noise of the variable area fan exhaust nozzle.

In any of the embodiments of the present invention the first actuation means 30, 130 may move the first movable members 18, 118 to positions between the un-actuated and actuated position. This is proportional control of the first movable members 18, 118. In any of the embodiments of the present invention the second actuation means 32, 132 may move the second movable members 20, 120 to positions between the un-actuated and actuated position. This is proportional control of the second movable members 20, 120. The first and second actuation means 30, 130, 32, 132 may use controlled, proportional control, heating to obtain positions between the un-actuated positions and the actuated positions.

In any of the embodiments of the present invention the first actuation means 30, 130 may move one or more individual ones of the first movable members 18, 118 rather than all of the first movable members 18, 118 in unison to give more controlled positions without the need for proportional control.

Figure 13:
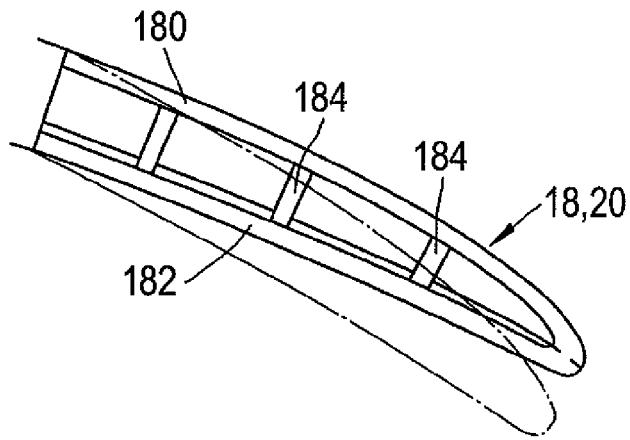
FIG. 13 is a cross-sectional view through a first embodiment of a movable member.

Each of the first movable members 18 or 118, as shown in FIG. 13 may comprise a flexural member 180, a shape memory material member 182 and web members 184. The flexural member 180 and the shape memory material member 182 are spaced apart by the web members 184 and the flexural member 180 and the shape memory material member 182 are joined together at the downstream end of the first movable member.

Each of the second movable members 20 or 120, as shown in FIG. 13 may comprise a flexural member 180, a shape memory material member 182 and web members 184. The flexural member 180 and the shape memory material member 182 are spaced apart by the web members 184 and the flexural member 180 and the shape memory material member 182 are joined together at the downstream end of the second movable member.

Figure 14:
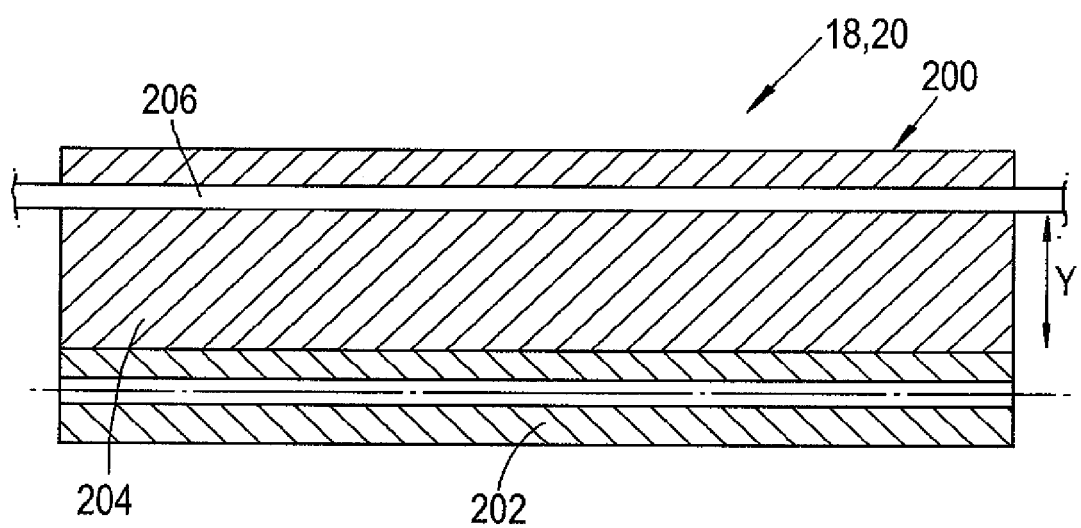
FIG. 14 is a cross-sectional view through a second embodiment of a movable member.

Each of the first movable members 18 or 118, as shown in FIG. 14, may comprise a composite article 200 having a composite member 202, a flexible member 204 and at least one shape memory material member 206. The at least one shape memory material member 206 extends substantially parallel to the composite member 202 and the flexible member 204 is positioned between the composite member 202 and the at least one shape memory material member 206 to bond the at least one shape memory material member 206 to the composite member 202 and to maintain a separation Y between the composite member 202 and the at least one shape memory material member 206.

Each of the second movable members 20 or 120, as shown in FIG. 14, may comprise a composite article 200 having a composite member 202, a flexible member 204 and at least one shape memory material member 206. The at least one shape memory material member 206 extends substantially parallel to the composite member 202 and the flexible member 204 is positioned between the composite member 202 and the at least one shape memory material member 206 to bond the at least one shape memory material member 206 to the composite member 202 and to maintain a separation Y between the composite member 202 and the at least one shape memory material member 206.

Thus the present invention discloses, in all of its embodiments, a variable area nozzle wherein in a first mode of operation arranging the cross-sectional area of the variable area nozzle is at a first cross-sectional area, in a second mode of operation arranging the cross-sectional area of the variable area nozzle at a second cross-sectional area, and in a third mode of operation arranging the cross-sectional area of the variable area nozzle at a third cross-sectional area, wherein the first mode of operation is take off conditions, the second mode of operation is at high power conditions and the third mode of operation is cruise conditions and wherein the second cross-sectional area is less than the first cross-sectional area and the third cross-sectional area is less than the first cross-sectional area and greater than the first cross-sectional area.

Preferably the first cross-sectional area is a maximum cross-sectional area, the second cross-sectional area is a minimum cross-sectional area and the third cross-sectional area is an intermediate cross-sectional area.

Although the present invention has been described with reference to the use of shape memory material first and second movable members and first and second heating means to change the position of the first and second movable members, it may be possible to use other types of first and second movable members and other types of actuators.

Although the present invention has been described with reference to a variable area nozzle with a wavy downstream end with triangular tabs it may be equally possible to have trapezoidal shaped tabs or other suitable shaped tabs.

Although the present invention has been described with reference to an annular fan casing, it is need not be annular, other suitable shapes may be used, but the movable members extend from its downstream end and are arranged around the fan casing.

What is claimed is:
1. A gas turbine engine comprising
a casing defining a flow passage through the gas turbine engine,
a variable area nozzle being arranged at a downstream end of the casing, the variable area nozzle having a plurality of first movable members arranged around and extending in a downstream direction from the downstream end of the casing and a plurality of second movable members arranged around and extending in a downstream direction from the downstream end of the casing,
in a first mode of operation the first movable members are in an un-actuated position and the second movable members are in an un-actuated position, in a second mode of operation the first movable members are in an actuated position and the second movable members are in the un-actuated position and in a third mode of operation the first movable members are in the un-actuated position and the second movable members are in an actuated position,
wherein the first movable members are movable outwardly from the un-actuated position to the actuated position and the second movable members are movable inwardly from the un-actuated position to the actuated position,
wherein the variable area exhaust nozzle comprises a plurality of fixed members arranged around the annular casing and extending in a downstream direction from the downstream end of the casing, with each fixed member being positioned between one of the first movable members and one of the second movable members.

2. A gas turbine engine as claimed in claim 1 comprising first actuation means to move the first movable members from the un-actuated position to the actuated position and second actuation means to move the second movable members from the un-actuated position to the actuated position.

3. A gas turbine engine as claimed in claim 2 wherein the first actuation means moves the first movable members to positions between the un-actuated and actuated position.

4. A gas turbine engine as claimed in claim 2 wherein the second actuation means moves the second movable members to positions between the un-actuated and actuated position.

5. A gas turbine engine as claimed in claim 1 wherein in the un-actuated position the first and second movable members are aligned.

6. A gas turbine engine as claimed in claim 1 wherein the first movable members being movable generally outwardly in the second mode of operation to increase the area of the variable area nozzle and the second movable members being movable generally inwardly in the third mode of operation to reduce the area of the variable area nozzle.

7. A gas turbine engine as claimed in claim 1, wherein the first and second movable members being arranged alternately around the variable area exhaust nozzle.

8. A gas turbine engine as claimed in claim 1 wherein the first movable members and the fixed members have cooperating means to locate the first movable members in the un-actuated position and prevent the first movable members moving inwardly.

9. A gas turbine engine as claimed in claim 1 wherein the second movable members and the fixed members have cooperating means to locate the second movable members in the un-actuated position and prevent the second movable members moving outwardly.

10. A gas turbine engine as claimed in claim 1 wherein the variable area nozzle is a variable area fan nozzle and the casing is a fan casing and a core engine casing is positioned with the fan casing.

11. A gas turbine engine as claimed in claim 1 wherein at least a portion of each first movable member comprises shape memory material.

12. A gas turbine engine as claimed in claim 11 wherein the first actuation means comprises heating means to heat the shape memory material portion of each first movable members.

13. A gas turbine engine as claimed in claim 1 wherein at least a portion of each second movable member comprises shape memory material.

14. A gas turbine engine as claimed in claim 13 wherein the second actuation means comprises heating means to heat the shape memory material portion of each second movable members.

15. A gas turbine engine as claimed in claim 1 wherein in the first mode of operation the variable area nozzle has an intermediate cross-sectional area, in the second mode of operation the variable area nozzle has a maximum cross-sectional area and in the third mode of operation the variable area nozzle has a minimum cross-sectional area.

16. A gas turbine engine as claimed in claim 1 wherein the casing is annular, the first movable members are arranged circumferentially around the annular casing, the second movable members are arranged circumferentially around the annular casing, the first movable members are movable radially outwardly from the un-actuated position to the actuated position and the second movable members are movable radially inwardly from the un-actuated position to the actuated position.

17. A method of operating a gas turbine engine having a casing defining a flow passage through the gas turbine engine, a variable area nozzle being arranged at a downstream end of the casing, the variable area nozzle comprising a plurality of first movable members arranged around and extending in a downstream direction from the downstream end of the casing and a plurality of second movable members arranged around and extending in a downstream direction from the downstream end of the casing, said method comprising the steps of:
in a first mode of operation
positioning the first movable members in an un-actuated position and positioning the second movable members in an un-actuated position,
in a second mode of operation,
positioning the first movable members to an actuated position and positioning the second movable members in the un-actuated position and
in a third mode of operation,
positioning the first movable members to the un-actuated position and positioning the second movable members in an actuated position,
moving the first movable members outwardly from the un-actuated position to the actuated position to increase the area of the variable area nozzle and
moving the second movable members inwardly from the un-actuated position to the actuated position to decrease the area of the variable area nozzle.

18. A method as claimed in claim 17 wherein the gas turbine engine includes a fan, the variable area nozzle being a variable area fan nozzle, the casing being a fan casing, a core engine casing being positioned within the fan casing, in the unactuated position the first and second movable members are aligned, in the first mode of operation the variable area nozzle has an intermediate cross-sectional area, in the second mode of operation the variable area nozzle has a maximum cross-sectional area and in the third mode of operation the variable area nozzle has a minimum cross-sectional area.

19. A method as claimed in claim 18 wherein the core engine casing has a region of increased diameter and a region of decreasing diameter downstream of the region of increased diameter, the region of increased diameter of the core engine casing being axially upstream of the downstream end of the variable area nozzle and axially upstream of the downstream ends of the second members.

* * * * *